Dec. 26, 1950  D. R. McFERON  2,535,440
POWER-OPERATED DOG FOR SAWMILL CARRIAGES
Filed Nov. 27, 1945  3 Sheets-Sheet 1

INVENTOR
DOUGLAS R. McFERON

BY
ATTORNEY

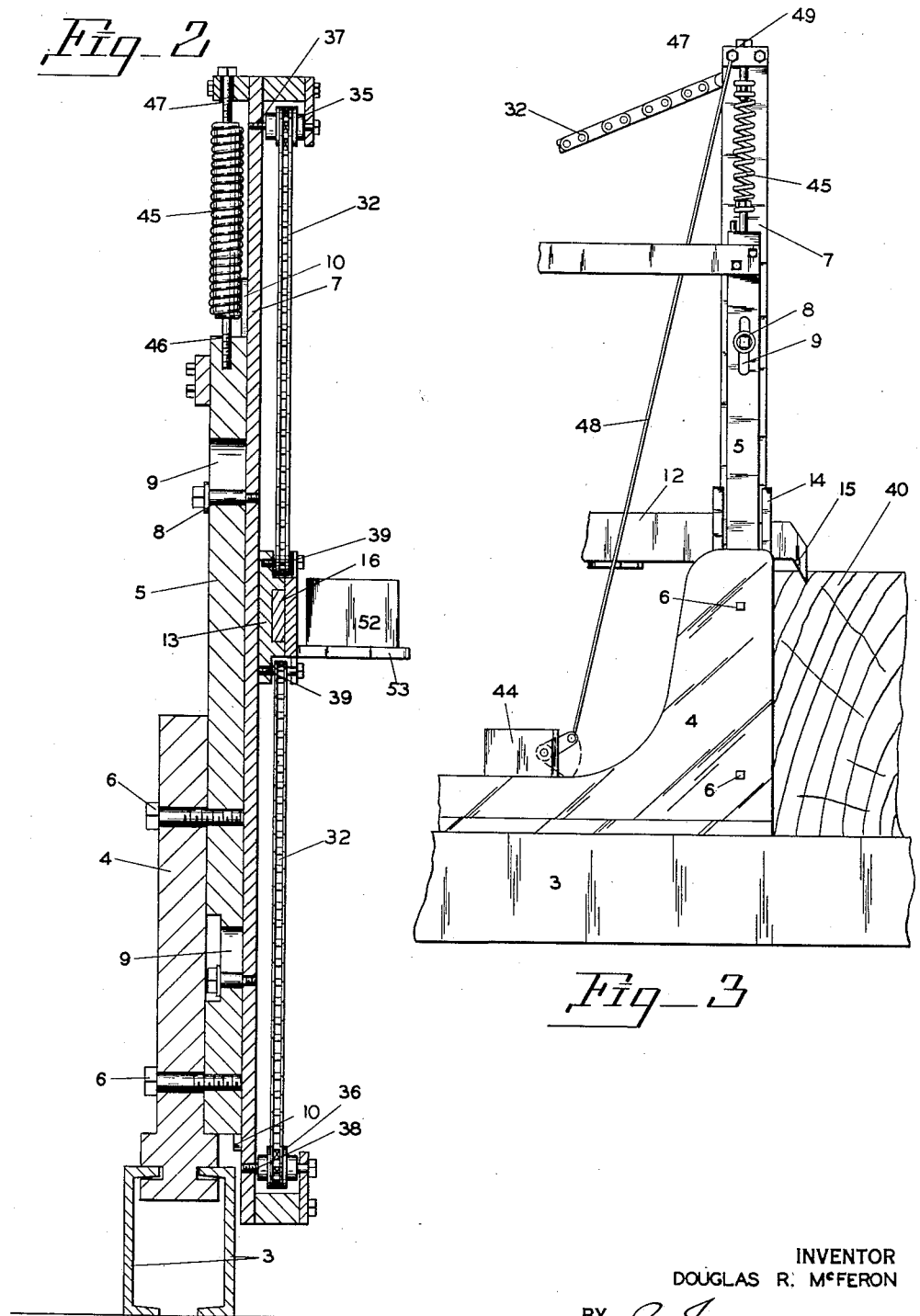

Dec. 26, 1950 D. R. McFERON 2,535,440
POWER-OPERATED DOG FOR SAWMILL CARRIAGES
Filed Nov. 27, 1945 3 Sheets-Sheet 3
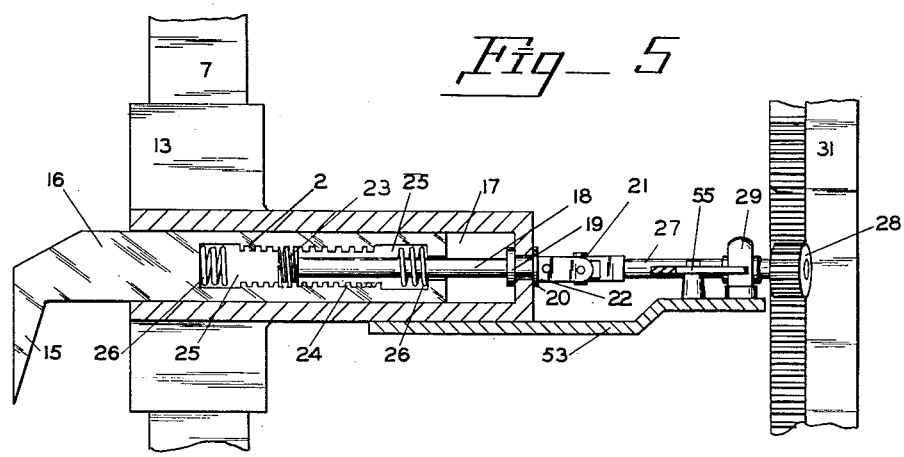
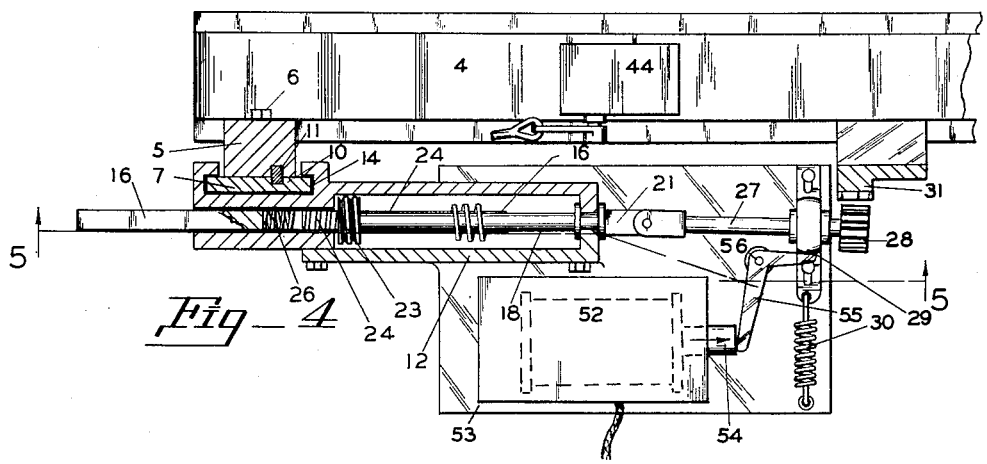
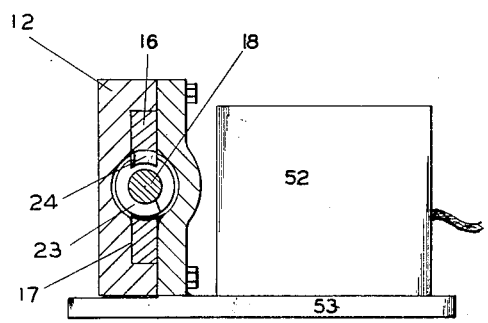
INVENTOR
DOUGLAS R. McFERON
ATTORNEY Patented Dec. 26, 1950

2,535,440

UNITED STATES PATENT OFFICE 2,535,440

POWER-OPERATED DOG FOR SAWMILL CARRIAGES

Douglas R. McFeron, Eugene, Oreg.

Application November 27, 1945, Serial No. 631,033

7 Claims. (Cl. 143—125)

This invention relates to power operated dogs for sawmill carriages and the primary object of the invention is to provide a mechanical operated dog that can be set and released by remote control.

A further object of the invention is the provision of an automatic stop throw-out control disengaging the power from the dog when the dog has made contact with the log.

Another object of the invention is the provision of means within the dog for adjusting the same in or out from the back stands of the carriage.

A still further object is to provide an automatic locking means for holding the dog in dogging position after engaging the log.

These and other incidental objects will be apparent in the drawings, specifications and claims.

Referring to the drawings:

Figure 3 is a fragmentary detail of the back stand and my automatic dog setter viewed from the opposite side than that shown in Figure 1, illustrating the dog in contact with the log and having just disengaged the feed mechanism.

Figure 4 is a detailed enlarged fragmentary sectional view, taken on line 4—4 of Figure 1, of part of the dog mechanism.

Figure 5 is a side sectional view, taken on line 5—5 of Figure 4, looking in the direction indicated.

Figure 6 is an end sectional view of the dog taken on line 6—6 of Figure 1.

Figure 7 is a diagrammatic lay out of the electric controls.

Figures 1, 2:
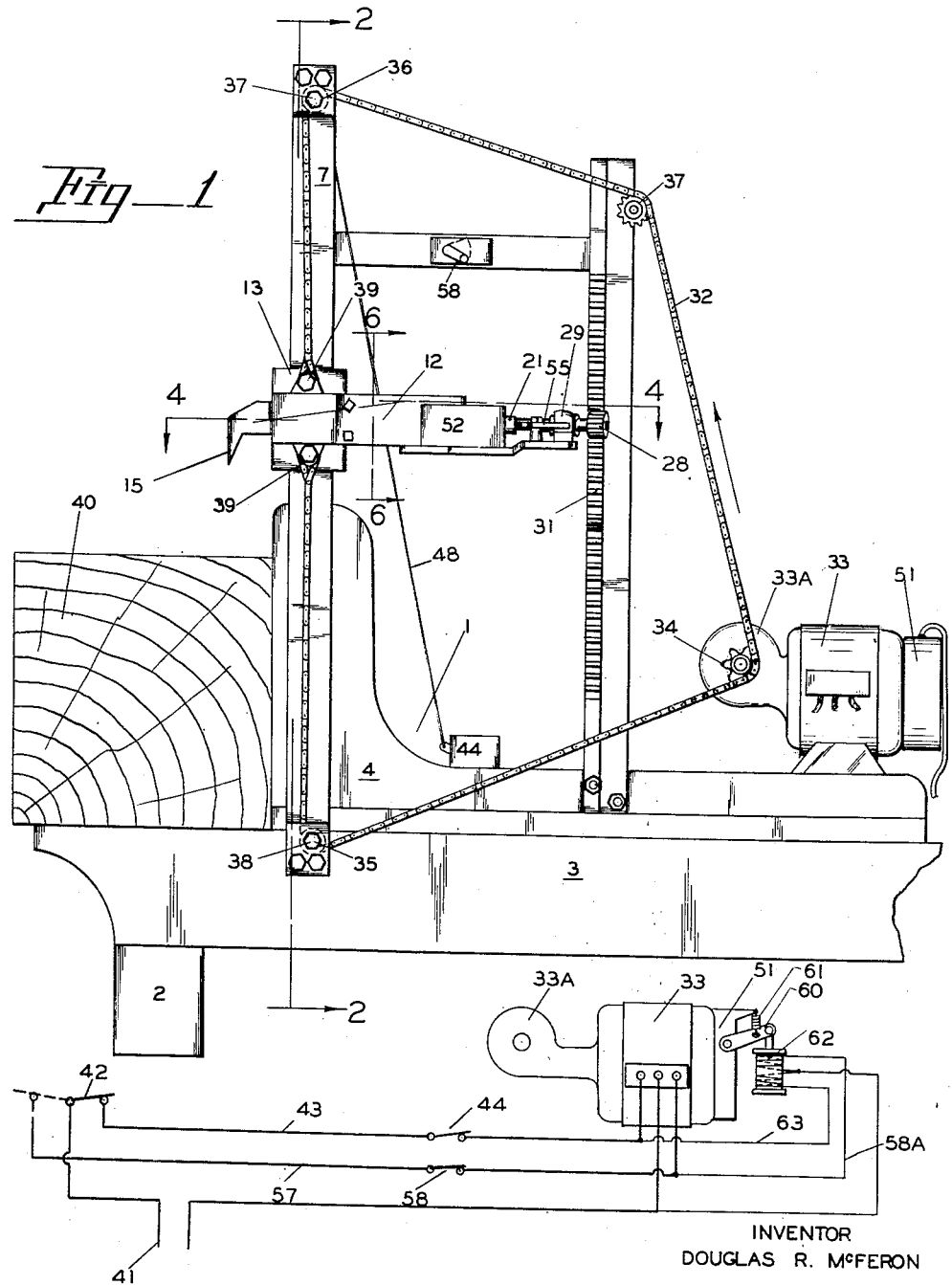
Figure 1 is an end sectional view taken through the cariage adjacent one of the back stands having my new and improved dog setting mechanism mounted thereon.
Figure 2 is a sectional view taken through the carriage, back stand and dog setting mechanism on line 2—2 of Figure 1.

Referring now to the drawings, specifically to Figs. 1–3, a typical sawmill carriage is shown with the usual frame 2, bed plate 3 and back stand 4. This carriage may be of any standard design well known in sawmill practice.

My invention comprises a vertically disposed frame 5 mounted on the back stand 4 by suitable holding means, as bolts 6. A vertical sub-frame 7 is adjustably mounted to the main frame 5 by spacer bolts 8 which are tapped into the frame 7 and work freely within the slots 9 of the main frame 5, permitting a movement longitudinally between the frame 5 and the sub-frame 7. The sub-frame 7 is guided in a parallel direction with the frame 5 by the rib 10 working within the key way 11 of the main frame 5, see Figure 4.

Referring to Figures 1 and 4, a movable dog assembly is indicated in general at 12 and consists of a guide block 13 having channels 14 embracing the sub-frame 7. The guide block 13 moves freely up and down on the sub-frame.

I will now describe the operation of the dog relative to its movement in and out from the back stand. Referring to Figures 4, 5 and 6, the dog is indicated at 15 and forms part of the flat bar 16, which is slidably mounted within the guide way 17. Rotatably and longitudinally mounted within the guide way is a shaft 18, which is held from end movement by the shoulder 19 and the washer 20. The washer 20 is held in place by the universal joint 21, which is keyed to the shaft 18 at 22. A screw thread 23 is formed on the opposite end of the shaft 18 and is threaded through the racks 24, forming part of the flat bar 16.

Located on either end of the racks 24 are openings or spaces 25 allowing the screw thread 23 to enter limiting the travel of the bar 16, even though the shaft 18 continues to revolve. Suitable springs 26 are provided for rethreading the screw thread 23 into the racks 24 on the reversal in direction of the shaft 18. The shaft 18 is connected to the drive shaft 27 by the universal joint 21. The opposite end of the shaft 27 has a gear 28 forming part thereof, the operation of which will be described later.

In order to raise and lower the dog a chain 32 is driven by a motor 33 through the speed reducer 33A and sprocket 34. Idler sprockets 35 and 36 are journalled to the sub-frame 7 at 37 and 38 and have the chain 32 running thereover. The ends of the chain are secured at 39 to the dog guide block 13, positioning the dog assembly 12 vertically relative to the sub-frame. The motor 33 can be run in either direction, thereby raising or lowering the dog assembly, as desired, by a remote control switch 42 (Fig. 7).

We will assume that we are going to bring the dog down upon the log 40. The remote switch 42 is closed in the position shown in Figure 7, current will flow from source of supply at 41 through the switch bar 42, conductor 43, through the switch 44 to the motor 33 moving the chain in the direction of the arrow (Fig. 1) lowering the dog device 12 to the position shown in Figure 3. When the dog engages the log, the pressure of the dog against the log will tend to raise the sub-frame 7, through the chain 32, against the spring 45, which is fixed at 46 to the upper end of the frame 5 and at 47 to the upper end of the sub-frame. As this upward movement of the sub-frame 7 takes place, best illustrated in Figure 3, the cable 48 connected to the upper end of the sub-frame at 49 will open the switch 44 stopping further rotation of the motor 33.

The motor 33 has a standard magnetic brake assembly 51, which has an operating arm 60 for applying the brake. A spring 61 applies the brake and holds the same applied until the electric solenoid 62 is energized, pulling the lever 60 against the action of the spring 61 thereby releasing the brake band, not here shown, enclosed within the brake assembly 51. When the remote switch 42 is closed in the position shown in Figure 7, energy flows through the conductor 41, 43, switch 44, conductor 63 and the solenoid 62, releasing the brake simultaneously with the starting of the motor. When the switch 44 is opened, by the pulling of the cable 48, the spring 61 will apply the brake, stopping the motor.

In the moving of the dogging unit 12 upwardly or away from the log, the switch bar 42 is moved to reverse position, the dotted line position illustrated in Figure 7, closing the circuit from the source 41 through the conductor 57, switch 58 to the motor 33, also through the conductor 58A to the magnetic brake 51, releasing the latter and allowing the motor to revolve in the opposite direction, moving the chain in the opposite direction of the arrow (Fig. 1) and raising the dogging unit 12 vertically on the sub-frame 7. In the event the operator should not open the switch 42 in time the unit 12 will strike the switch 58, best illustrated in Figure 1, opening the circuit and stopping the dog unit 12.

I will now describe the operation of the movement of the dog 15 towards and away from the back stand 4. As the motor 33 revolves, raising or lowering the dog unit 12, referring to Figures 4 and 5, the core 54 of the solenoid unit 52 operates the bell crank 55 about its pivot point 56 when a remote control switch is operated, not here shown. When the core 54 travels in the direction of the arrow (Fig. 4) it operates the bell crank 55, forcing the pillow block 29 towards the rack 31 engaging the gear 28 with the rack. As the dogging unit 12 travels up or down on the sub-frame, the shaft 27 is then revolved, together with the screw thread 23, which moves the dog 15 in or out of the guide way 17, depending on whether the dogging unit is travelling up or down. When the circuit through the solenoid 52 is opened the spring 30 disengages the gear 28 from the rack 31, stopping the in or out movement of the dog 15.

I do not wish to be limited to the exact mechanical construction as illustrated, as other forms of mechanical embodiment may be used still coming within the scope of my claims.

I claim:

1. A sawmill dog mechanism comprising a stationary frame, an elongated vertically positioned guide frame movably mounted on said stationary frame, a dog slidably mounted on said guide frame, means for moving said dog vertically along said guide frame, means for driving said moving means, means for starting said driving means, means operated by said moving means and operative upon the stoppage of movement of the dog by abutment with a log for moving said guide frame, and means operative by the movement of said guide frame for stopping said driving means.

2. A sawmill dog mechanism comprising a stationary frame, an elongated vertically positioned guide frame movably mounted on said stationary frame for substantially vertical movement, means resiliently biasing said guide frame downwardly, a dog slidably mounted on said guide frame, means for moving said dog vertically along said guide frame, means for driving said moving means, means for starting said driving means, means operated by said moving means and operative upon the stoppage of movement of the dog by abutment with a log for moving said guide frame upwardly, and means operative by the upward movement of said guide frame for stopping said driving means.

3. A sawmill dog mechanism comprising a stationary frame, an elongated vertically positioned guide frame movably mounted on said stationary frame for vertical movement, a dog slidably mounted on said guide frame, means for moving said dog vertically along said guide frame, means for driving said moving means, manual means for starting said driving means, means operated by said moving means and operative upon the stoppage of downward movement of the dog by abutment with a log for moving said guide frame, means operative by the movement of said guide frame for stopping said driving means, and means operative by said dog at the end of its upward movement for stopping said driving means.

4. A sawmill dog mechanism comprising a knee having a log-engaging face, a vertically positioned stationary frame mounted on said knee parallel to said face, a vertically positioned guide frame movably mounted on said stationary frame for substantially vertical movement, a shoe slidably mounted on said guide frame, a dog carried by said shoe, pinions journalled at the top and bottom of said guide frame, a pinion intermediate said top and bottom pinions, a chain anchored to said shoe and trained about said pinions, means for driving said chain to move said shoe vertically along said guide frame, and means operative by the upward movement of said guide frame incident to the upward pull upon the bottom pinion by said chain through stoppage of the dog by contact with a log in front of said knee for stopping said chain driving means.

5. A sawmill dog mechanism comprising an elongated vertically positioned guide frame, a shoe slidably mounted on said guide frame, a dog slidably supported by said shoe for substantially horizontal movement, means for moving said shoe vertically along said guide frame, means operated by the movement of said shoe for moving said dog relative to said shoe, and means for selectively controlling the actuation of said dog moving means to permit independent movement of said shoe while said dog is stationary thereon.

6. A mechanism as defined in claim 5 wherein said dog moving means comprises a rack, parallel to said guide frame, screw mechanism for moving said dog horizontally in said shoe, a pinion for meshing with said rack, a universal joint between said pinion and screw mechanism to permit movement of said pinion perpendicularly of said rack, and means for selectively engaging said pinion with said rack to operate said screw mechanism.

7. A sawmill dog mechanism comprising, in combination, a stationary frame, a vertically positioned guide frame movably mounted on said stationary frame for substantially vertical movement, a shoe slidably mounted on said guide frame, a dog slidably carried by said shoe for substantially horizontal movement, means for moving said shoe vertically along said guide frame, means for driving said moving means, means operated by movement of said shoe for moving said dog relative to said shoe, means for limiting movement of said dog at the end of its stroke while permitting continued operation of said dog moving means, means operative by said shoe moving means and operative upon the stoppage of movement of the dog by contact with a log for moving said guide frame, means operated by the movement of said guide frame for stopping said driving means, and means operated by said shoe at the upper end of its movement for stopping said driving means.

DOUGLAS R. McFERON.

REFERENCES CITED

The following references are of record in the file of this patent:

UNITED STATES PATENTS

| Number | Name | Date |
|---|---|---|
| 139,264 | Rodgers | May 27, 1873 |
| 963,770 | Jones | July 12, 1910 |
| 1,637,907 | Langill et al. | Aug. 2, 1927 |
| 1,774,311 | Bidwell et al. | Aug. 26, 1930 |
| 1,944,285 | Haase | Jan. 23, 1934 |
| 1,944,287 | Langill | Jan. 23, 1934 |
| 2,377,236 | Jackson | May 29, 1945 |